Feb. 9, 1937.  A. C. HOUGLAND  2,069,741
COMBINATION BRAKE AND CLUTCH FOR CHURNS AND THE LIKE
Original Filed Aug. 17, 1931  2 Sheets-Sheet 1

INVENTOR
Albert C. Hougland
BY
ATTORNEYS

INVENTOR
Albert C. Hougland
BY
ATTORNEYS

Patented Feb. 9, 1937

2,069,741

UNITED STATES PATENT OFFICE 2,069,741

COMBINATION BRAKE AND CLUTCH FOR CHURNS AND THE LIKE

Albert C. Hougland, St. Paul, Minn., assignor to Crane Company of Minnesota, St. Paul, Minn., a corporation of Minnesota Original application August 17, 1931, Serial No. 557,597. Divided and this application March 4, 1935, Serial No. 9,209

7 Claims. (Cl. 192—18)

This invention relates to a combination clutch and brake, the application being a division of my co-pending application for patent for Driving mechanism for churns, Serial No. 557,597, filed August 17, 1931.

It is an object of this invention to provide a novel combination clutch and brake, particularly, although not exclusively, adapted for use with machines such as churns where there is a heavy rotating body which must be stopped and retained in predetermined positions with varying degrees of force and where any attempt to apply the brake when the machine is in operation would be apt to damage the driving mechanism.

A further object is to provide novel brake mechanism adapted to apply the braking force instantaneously and with adequate power while requiring little effort on the part of the operator.

The invention will be best understood by reference to the accompanying drawings in which.

Figure 1:
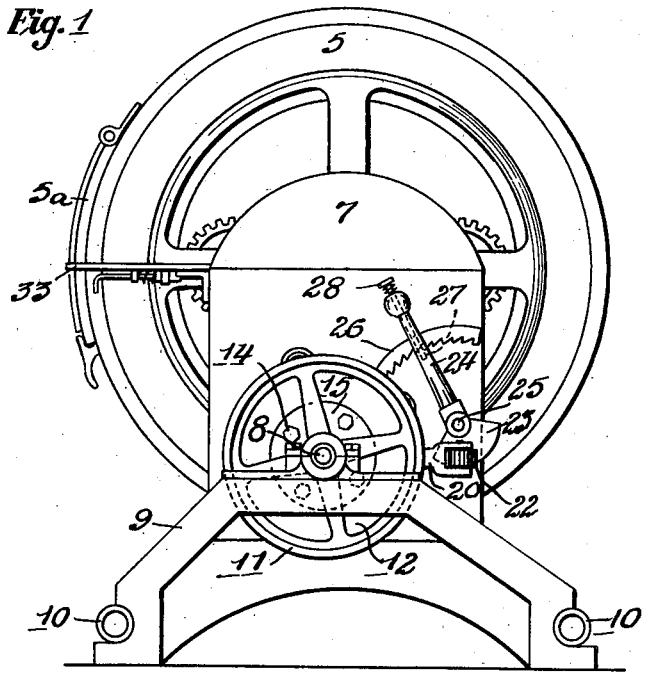
Figure 1 is an end view of a churn showing my improved brake and clutch mechanism mounted thereon.

Referring to the drawings, a large, cylindrical churn 5 is disposed with its axis of rotation horizontal. The machine has power driven mechanism for rotating the body 5 at suitable speeds for churning and working butter within said body. Access to the interior of the body 5 is provided for through a door 5a (Fig. 1). The ends of the body 5 are supported in the usual manner by bearings or trunnions. One of these bearings is indicated by the numeral 6 and is supported on a gear housing 7 containing suitable change speed gearing. A preferred embodiment of such gearing is described in my application bearing Serial No. 557,597, filed August 17, 1931.

Projecting from the housing 7 is the main drive shaft of the churn, indicated by the numeral 8. The outer end of this shaft is supported in a standard 9 disposed in spaced relation to the housing 7 and connected thereto by tubular frame members 10. Freely revoluble on the shaft 8 is a drive pulley 11 and fitting within this pulley is a clutch member 12 of the conical type. This clutch member is secured to the shaft 8 by keys 13 and is slidable longitudinally thereon to and from engagement with the pulley 11. The clutch member 12 is normally held in engagement with the pulley by bolts 14 which extend through perforations in a disk 15 and have coiled springs 16 confined between said disk and the heads of the bolts. The disk 15 fits loosely on the shaft 8 and is arranged to transmit the thrust of the springs 16 to the ends of the keys 13. The keys 13 are held against movement longitudinally of the shaft 8 in keyways therein and the ends of these keys engage the face of the disk 15 to retain said disk in spaced relation to the clutch member 12.

The clutch member 12 has a hub 17 and a collar 18 is freely revoluble in a suitable recess in the hub 17. Studs 19 project from a forked lever 20 to engage the collar 18 for shifting the clutch member 12 along the shaft 8. The lever 20 is pivotally supported on a bracket 21 secured to the housing 7 and an end of this lever carries a roller 22 adapted to be engaged by an arcuate cam 23. The cam 23 is integral with the lower extremity of a manually operable lever 24 having a pivot 25 projecting from the housing 7. A toothed quadrant 26 is mounted on the housing 7 to be engaged by a dog 27 on the lever 24 for retaining said lever in predetermined positions. To actuate the dog 27 a button 28 is provided on the free end of the lever 24, this button being connected to the dog and normally held in operative position by a small spring. The button 28 is depressed to release the lever from the quadrant 26.

Adjacent to the clutch member 12 is rigidly mounted a brake ring 29 adapted to be engaged by an annular surface 30 formed on the clutch member 12. The ring 29 is integral with a cylindrical housing 31 bolted to the gear housing 7. The shaft 8 is operatively connected to the churn body 5 and butter working rolls therein by gearing within the housing 7. Projecting from this housing is a lever 32 for changing from one speed to another and a clutch lever 33 to control the connection between the butter working rolls and the shaft 8.

Figure 2:
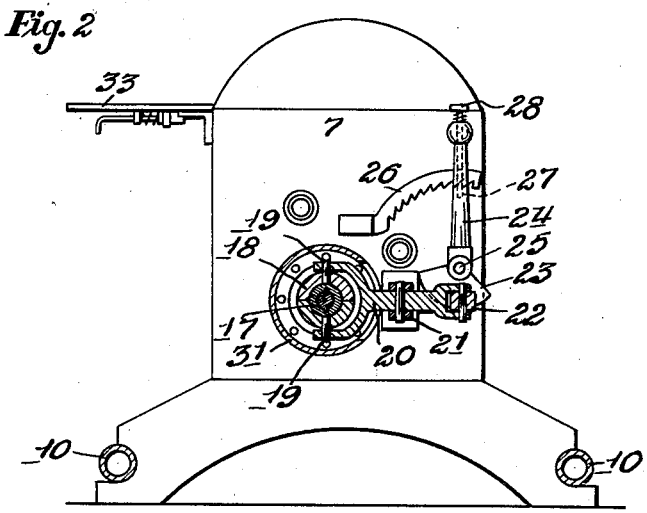
Fig. 2 is a vertical section taken on the line 2—2 of Fig. 3.
Figure 3:
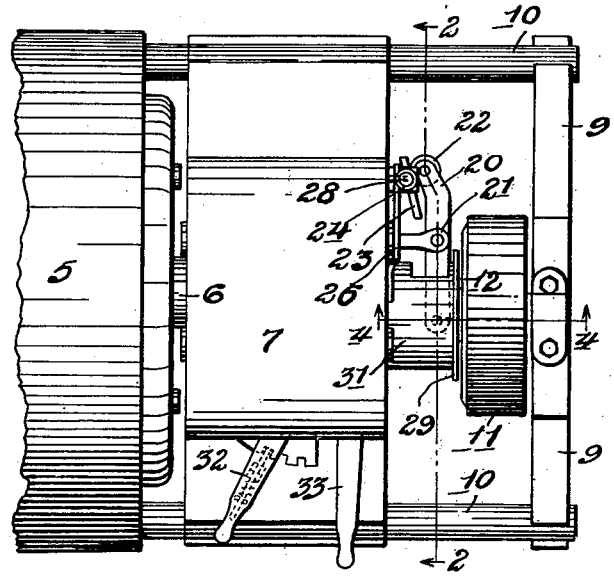
Fig. 3 is a plan view of my device, together with a portion of the churn on which it is mounted.
Figure 4:
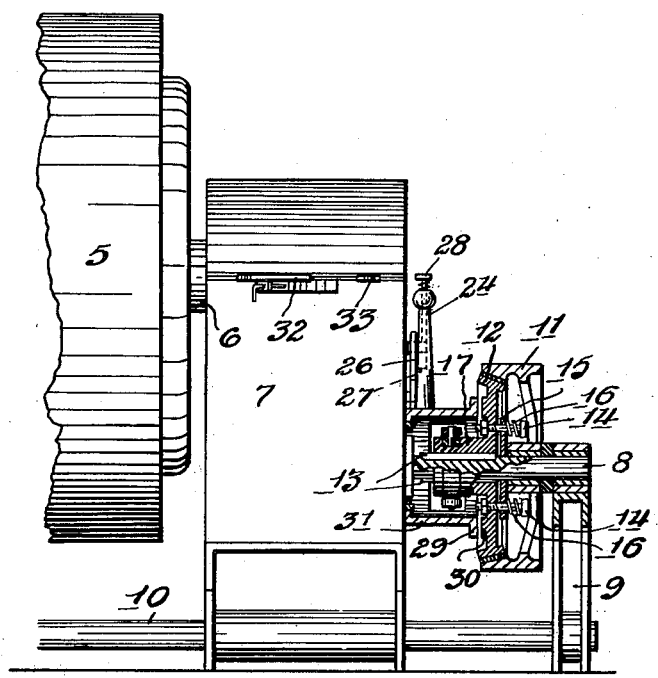
Fig. 4 is a partial side elevation and partial central vertical section taken on the line 4—4 of Fig. 3.

When the churn is in operation, the lever 24 is in the position indicated in Fig. 2, wherein the springs 16 on the bolts 14 retain the clutch member 12 in engagement with the driving pulley 11. When the churn is to be stopped for examination or testing of the contents or for other reason such as to permit withdrawal of the buttermilk or upon completion of the working of a quantity of butter, it is only necessary to manipulate the lever 24. This is done at the moment the door 5a in the cylindrical periphery of the churn 5 or buttermilk outlet reaches such position as to permit removal of the contents or inspection of the interior conveniently. The angle of the face of the cam 23 which engages the roller 22 is such that the force exerted by the springs 16 is insufficient to move the lever 24 from any selected position. Thus the toothed quadrant 26 and dog 27 are not essential to the operation but are employed as a safety measure. With a load of several hundreds or thousands of pounds in the churn, as is frequently the case, it is desirable to turn it by power to the position where it is to be stopped. Obviously this requires an instantaneous clutch operation and application of the brake with considerable force.

My device is particularly designed for this use. The space between the face of the brake ring 29 and annular surface 30 of the clutch member 12 is made small so as to permit instantaneous application of the brake upon the release of the clutch. As will now be understood, the operator merely moves the lever 24 to the left from its position shown in Fig. 2 to disconnect the clutch and also to apply the brake quickly when required. In this operation the cam 23 actuates the fork lever 20 about its pivotal support in the bracket 21 against the action of the springs 16, until the annular face 30 of the member 12 is brought into firm engagement with the stationary brake ring 29. The arcuate cam 23 is capable of applying the brake with great force and quickly when desired, or gradually and with light pressure, such as would permit the manual turning of the churn body against slight friction. By my arrangement of the cam 23 relative to the levers 24 and 20, the lever 24 is retained in the exact position to which it is moved manually so that the brake is applied with any desired degree of pressure and the position of the clutch 12 is accurately controlled to avoid strains on the mechanism such as would be caused by sudden engagement of said clutch with the drive pulley 11.

Having described my invention, what I claim as new and desire to protect by Letters Patent is:

1. In mechanism of the class described, a shaft, an annular brake member keyed to said shaft and movable longitudinally thereon, a fixed brake element mounted adjacent to said movable brake element to be engaged thereby, a brake lever, means for securing said lever in a plurality of operative positions, a second lever operatively connected to said movable brake element to move the same longitudinally of said shaft and cam means operatively connecting said second lever to said first mentioned lever.

2. In controlling mechanism for a revoluble load, a power shaft, means revolubly connecting said shaft to said load, an annular brake member keyed to said shaft and movable longitudinally thereon, a fixed brake element disposed concentrically to said shaft and arranged to be engaged by said movable brake element, a brake lever, means for securing said lever in a plurality of operative positions, a second lever operatively connected to said movable brake element to move the same longitudinally of said shaft and cam means operable by said first mentioned lever to actuate said second lever to secure said load in selected angular positions.

3. Mechanism of the class described comprising, a power shaft, means for driving said shaft, a clutch mounted on said shaft for operatively connecting said driving means thereto, said clutch being movable longitudinally of said shaft, an annular brake surface formed on said clutch, a fixed brake member disposed adjacent to said brake surface of said clutch, a lever operatively connected to said clutch to move the same along said shaft, a second lever and cam means operatively connecting said first mentioned lever to said second lever.

4. In mechanism for driving a churn, a power shaft, an annular brake member revoluble with said shaft and movable longitudinally thereon, a fixed brake element adapted to be engaged by said movable brake element, driving connections between said shaft and churn and manually operable means for actuating said movable brake element to engage said fixed brake element comprising, a lever, means for securing said lever in predetermined positions, a second lever operatively connected to said movable brake element and movable in a plane substantially perpendicular to the plane of movement of said first mentioned lever, and cam means movable with one of said levers and operatively connected to the other of said levers for forcibly and adjustably applying said movable brake member to said fixed brake element and arranged to be actuated by said first mentioned lever.

5. In mechanism for driving a churn, a power shaft, an annular brake element revoluble with said shaft and movable longitudinally thereon, a fixed brake ring adapted to be engaged by said movable brake element, resilient means for normally retaining said movable element out of engagement with said fixed element, driving connections between said shaft and churn and manually operable means for selectively operating said movable brake element to engage said brake ring comprising, a lever, means for securing said lever in predetermined positions, a second lever operatively connected to said movable brake element and roller and cam members operatively connecting said levers together.

6. In mechanism of the class described, a fixed brake member, a second brake member movable to and from engagement with said fixed brake member, a brake lever movable in a plane perpendicular to the direction of movement of said second brake member, a second lever connected to said movable brake member to move the same to and from engagement with said fixed brake member and cam means operatively connecting said second lever to said first mentioned lever.

7. In mechanism of the class described, a shaft, a combination clutch and brake member movable along said shaft, a fixed brake member adapted to be engaged by said combination member, a brake lever movable in a plane perpendicular to said shaft, a second lever operatively connected to said combination member to move the same to and from engagement with said fixed brake member and cam means operatively connecting said second lever to said first mentioned lever.

ALBERT C. HOUGLAND.